United States Patent
Vogel

(10) Patent No.: US 6,530,754 B2
(45) Date of Patent: Mar. 11, 2003

(54) TURBOCHARGER, IN PARTICULAR EXHAUST-GAS TURBOCHARGER FOR AN INTERNAL COMBUSTION ENGINE

(75) Inventor: Karl-Heinz Vogel, Backnang Steinbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/962,857

(22) Filed: Sep. 25, 2001

(65) Prior Publication Data

US 2002/0037226 A1 Mar. 28, 2002

(30) Foreign Application Priority Data

Sep. 26, 2000 (DE) .......................... 100 47 405

(51) Int. Cl.⁷ .............................. F04B 17/100
(52) U.S. Cl. ......................... 417/407; 60/602
(58) Field of Search ................. 417/407, 207, 417/417; 415/111, 110; 184/6.21; 384/100–101, 113; 60/602; 416/244 A

(56) References Cited

U.S. PATENT DOCUMENTS

| | | | | |
|---|---|---|---|---|
| 3,038,318 A | * | 6/1962 | Hanny | 417/407 |
| 4,142,608 A | * | 3/1979 | Sarle | 417/407 |
| 4,279,576 A | * | 7/1981 | Okano et al. | 417/407 |
| 4,953,110 A | * | 8/1990 | Chartrand | 60/602 |

FOREIGN PATENT DOCUMENTS

| | | | | |
|---|---|---|---|---|
| FR | 2 584 778 A1 | * | 1/1987 | 417/407 |
| JP | 354020212 A | * | 2/1979 | 417/407 |
| JP | 359221426 A | * | 12/1984 | 417/407 |

* cited by examiner

Primary Examiner—Thomas Denion
Assistant Examiner—Thai-Ba Trieu
(74) Attorney, Agent, or Firm—Klaus J. Bach

(57) ABSTRACT

An exhaust gas turbocharger for an internal combustion engine includes a turbine wheel and a compressor impeller, disposed on a common shaft which is rotatably supported by friction bearings, to which lubricating oil is supplied by an oil supply means, a turbine speed detection device being provided with a pressure modulating structure, which is disposed on the shaft for modulating the oil pressure in the oil supply means, in accordance with the speed of the shaft, and an oil pressure sensor arranged in the oil supply means for sensing the oil pressure modulations for determining the speed of the turbocharger.

7 Claims, 1 Drawing Sheet

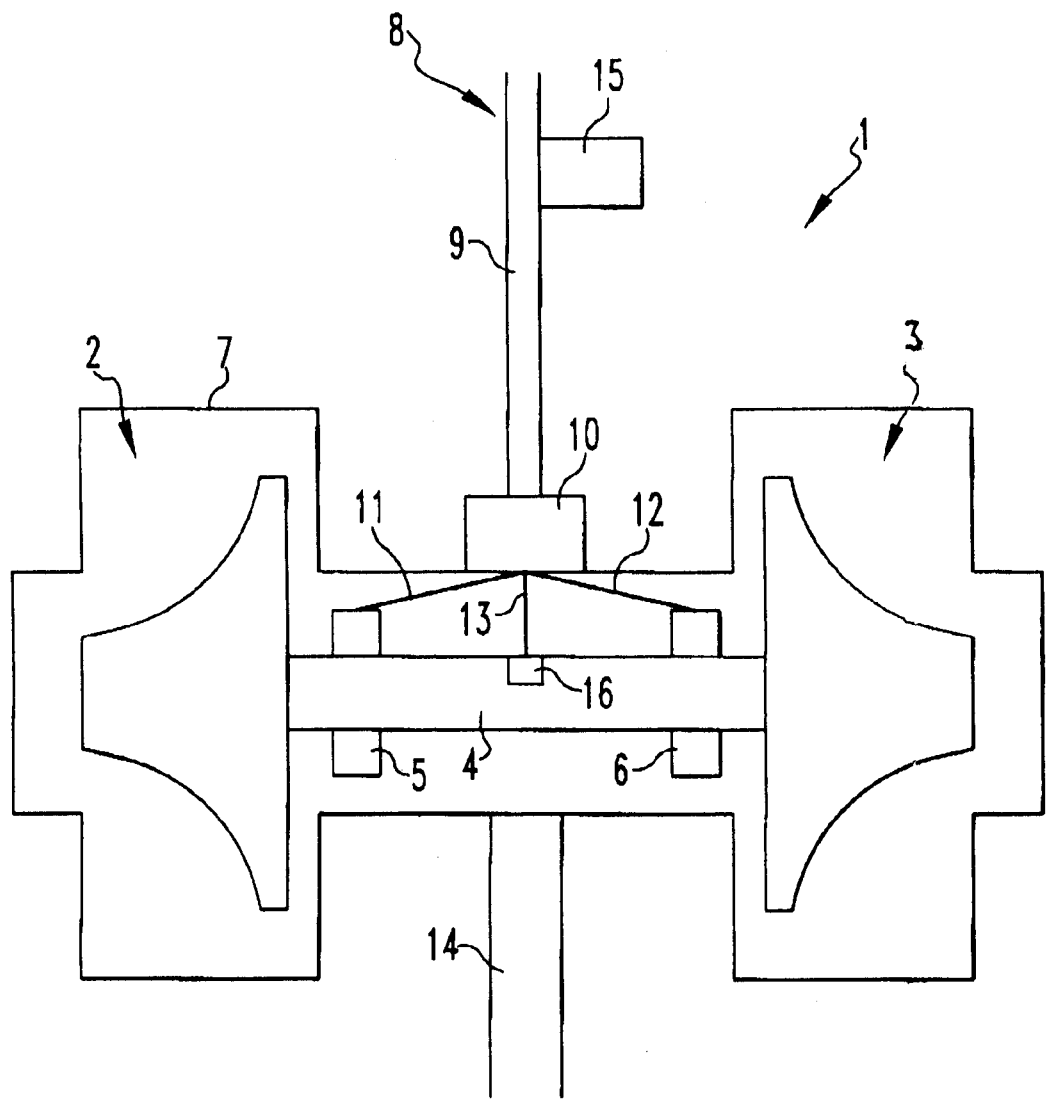

TURBOCHARGER, IN PARTICULAR EXHAUST-GAS TURBOCHARGER FOR AN INTERNAL COMBUSTION ENGINE

BACKGROUND OF THE INVENTION

The invention relates to a turbocharger, in particular an exhaust-gas turbocharger for an internal combustion engine, including a turbine and a compressor interconnected by a shaft rotatably supported by friction bearings.

Exhaust-gas turbochargers have been used for a long time in internal combustion engines for increasing the power and torque of the engine. Such exhaust-gas turbochargers comprise an exhaust-gas turbine which is arranged in the exhaust tract of the internal combustion engine and is acted upon by the exhaust gases, and also a compressor arranged in the intake tract of the internal combustion engine for compressing the sucked-in combustion air to an increased boost pressure. The compressor is connected via a shaft to the exhaust-gas turbine and is driven by the latter. On account of the high rotational speed of the charger, which may reach 200,000 revolutions per minute, it is necessary to have an accurate mounting of the rotating parts of the turbocharger, which, as described for example in the publication DE 35 22 595 C2, may be supported by friction bearings which are disposed in the housing of the exhaust-gas turbocharger and to which lubricating oil is supplied via an oil-pressure supply device.

The determination of the rotational speed of the turbocharger plays an important part in controlling and regulating the operating behavior of the internal combustion engine in the power mode and also in the enginebraking mode. The rotational speed of the turbocharger is required, for example, for regulating actions by the engine management system. Another application is the setting of the position of a variable turbine geometry, via which the effective turbine inlet flow cross section can be controlled variably, while the internal combustion engine is running, in order to broaden the power range of the charger and the internal combustion engine both in the engine power mode and in the enginebraking mode.

The publication DE 690 01 636 T2 describes the use of a rotational-speed sensor, via which the rotational speed of the shaft is detected and fed to a control device which generates from the measurement signal representing the rotational speed an actuating signal for opening a solenoid valve, via which oil pressure can be fed to a functional bearing of the shaft, in order to subject the shaft to a correction of equilibrium, particularly at very high rotational speeds.

Rotational-speed sensors of this type for detecting the rotational speed of the turbocharger are designed, for example, as inductive sensors which, however, require a water-cooled turbocharger.

It is the object of the invention to determine the rotational speed of the turbocharger with high reliability, using simple structural measures.

SUMMARY OF THE INVENTION

An exhaust gas turbocharger for an internal combustion engine includes a turbine wheel and a compressor impeller disposed on a common shaft which is rotatably supported by friction bearings to which lubricating oil is supplied by oil supply means, a turbine speed detection device is provided comprising a pressure modulating structure disposed on the shaft for modulating the oil pressure in the oil supply means in accordance with the speed of the shaft and an oil pressure sensor is arranged in the oil supply structure for sensing the oil pressure modulations for determining the speed of the turbocharger.

The pressure modulation device correlates with the rotational speed of the shaft, so that the oil pressure modulation—the pressure fluctuations in the oil—can be used as a measure for the rotational speed. The modulation of the oil pressure in the oil supply device can be measured by an oil-pressure sensor which may be a commercially available pressure sensor. It is simple in design and is engaged in use. This provides for a significant simplification in the detection of the rotational speed of the turbocharger, particularly for the situation where the oil supply device includes a pressure sensor which is used for regulating the oil pressure in the friction bearings of the shaft, in this case, the oil-pressure sensor, in addition to measuring the absolute pressure, may assume a further function, that is, the measurements of pressure fluctuations which are imparted to the oil via the pressure modulation device and which are superposed as relatively minor pressure fluctuations on the relatively high absolute pressure of the act. The pressure fluctuations may be evaluated by conventional valuation methods in an evaluation unit and the rotational speed of the charger can be determined from the pressure fluctuations.

In a particular embodiment of the invention, the pressure modulation device is designed as a modulation unit which is connected to the shaft and rotates fixedly relative to the latter. It may be designed as a structural part out of rotational symmetry and acting upon the oil, so that, during each revolution of the shaft, pressure pulsations occur in the oil in rhythm with the rotational speed of the charger. These pulsations can be measured via the oil-pressure sensor. The pressure pulsations take place due to the deviation of the modulation unit from the rotational symmetry, in that, during each revolution of the charger shaft, specific portions of the modulation unit having a larger radius alternate with other portions having a smaller radius and are connected operatively to the oil supply device. The operative connection is advantageously made solely in a mechanical way, in that the modulation unit acts directly upon an oil reservoir of the oil supply device. For example, oil from the oil reservoir may come into contact directly with the modulation unit. During rotation of the shaft, the necessary pressure pulsations are generated by the alternating portions of the modulation unit having a different radius and can be detected by a pressure sensor.

In an embodiment which can be implemented in a particularly simple way, the modulation unit is designed as a milled duct which is introduced into the shaft casing and extends preferably in the circumferential direction, but only over part of the circumference of the shaft, so that, during each shaft revolution, that radially set-back portion of the shaft casing into which the milled duct is introduced alternates with that portion in the shaft casing without the milled duct. The milled duct is in this case arranged preferably symmetrically in the middle of the shaft between the charger and the compressor.

The invention will become more readily apparent from the following description of an embodiment thereof on the basis of the accompanying drawing.

BRIEF DESCRIPTION OF THE DRAWING

The sole FIGURE shows schematically a turbocharger with an oil supply device, a pressure modulation device and an oil-pressure sensor.

DESCRIPTION OF A PARTICULAR EMBODIMENT

The turbocharger 1 is designed, in particular, as an exhaust-gas turbocharger for an internal combustion engine and comprises a turbine 2, which is arranged in the exhaust tract of the internal combustion engine and is acted upon by the exhaust gases which are under excess pressure and also a compressor 3 in the intake tract of the internal combustion engine. The compressor 3 is connected via a shaft 4 to the turbine 2 for rotation therewith and is driven by the latter, whereby the sucked-in combustion air is compressed to an increased boost pressure. The shaft 4 is mounted rotatably in oil-lubricated friction bearings 5 and 6, via which the turbine 2, the compressor 3 and the shaft 4 are supported in a housing 7 of the turbocharger 1.

The friction bearings 5 and 6 are supplied with lubricating oil via an oil supply device 8 which comprises an oil inflow line 9 with an oil-pressure sensor 15 arranged in it, a distributor 10, two oil supply ducts 11 and 12 for feeding lubricating oil to the friction bearings 5 and 6, an oil-pressure modulation duct 13 and an oil return line 14. The oil supply device 8 supplies lubricating oil to the friction bearings 5 and 6 via the oil inflow line 9, the distributor 10 and the oil supply ducts 11 and 12.

The oil pressure in the oil supply device 8 can be determined by the oil-pressure sensor 15. The oil pressure as measured by the oil-pressure sensor 15 is fed as a measurement signal to a regulating and control unit, in which actuating signals can be generated as a function of the measured oil pressure. The actuating signals are intended to act upon actuating devices for setting a desired pressure, by means of which the lubricating oil is to be fed to the friction bearings 5 and 6.

In order to determine the rotational speed of the shaft 4, a pressure modulation device is provided, which modulates the oil pressure in the oil supply device 8, by superimposing on the oil pressure pressure fluctuations or pulsations whose frequency represents the rotational speed. In this way, the oil-pressure sensor 15, in addition to measuring the absolute pressure in the oil supply device 8, also assumes the determination of the rotational speed of the shaft. The pressure pulsations, which include the information on the rotational speed, are expediently of a magnitude which, although being detectable by the pressure sensor, is negligible in comparison with the absolute pressure, so that the pressure pulsations do not give rise to any disadvantages in the supply of oil to the friction bearings 5 and 6 or in the functioning of the friction bearings.

In the exemplary embodiment, the pressure modulation device consists of a recess 16 which is milled into the shaft 4 preferably in the middle between the turbine 2 and the compressor 3 or the friction bearing 5 and the friction bearing 6. The milled recess 16 extends in the circumferential direction of the shaft, but only over a part of the circumference. As a result, in the plane of the milled recess 16, there are, in relation to the rest of the surface of the shaft 4, portions which are set back radially over that portion over which the recess extends.

The oil-pressure modulation duct 13, which, like the oil supply ducts 11 and 12 for the friction bearings 5 and 6, branches off from the distributor 10, and extends to the shaft 4 in the region of the pressure modulation device formed by the milled recess 16. During a single complete revolution of the shaft 4, the oil in the oil-pressure modulation duct 13 comes into contact both with the radial recess 16 and with those wall portions of the shaft 4 which are not recessed and the radius of which corresponds to that of the surface of the shaft 4. By virtue of the different radii, a pressure fluctuation occurs during each shaft revolution, the pressure falling slightly when the modulaton duct is in communication with the recesse 16—and the pressure increasing again during contact with an area raised radially in relation to it—the unmachined surface of the shaft 4. A pressure fluctuation which can be detected by the oil-pressure sensor 15 thus occurs during each revolution. The number of pressure fluctuations is proportional to the rotational speed.

Instead of a milled recess in the shaft, recesses with a cross section deviating from the milled recess, for example bores, are also suitable. Moreover, alternatively or additionally to radially set-back recesses, radially raised portions may also be provided on the shaft surface. Finally, it may also be expedient to provide a structural part, produced separately from the shaft, but connected fixedly in terms of rotation to the shaft, so as to form a pressure modulation device with radially set-back and radially raised portions in a radial plane perpendicular to the longitudinal axis of the shaft.

In a further embodiment, it may be appropriate to uncouple the pressure fluctuations generated via the modulation unit from the pressure in the oil lines, via which the friction bearings are supplied with oil, so that a constant fluctuation-free pressure can be obtained in the friction bearings and, if appropriate, in the oil supply.

What is claimed is:

1. An exhaust gas turbocharger for an internal combustion engine, comprising: a turbine with a turbine wheel, a compressor with an impeller, a shaft extending between and supporting said turbine wheel and said impeller, said shaft being rotatably supported by friction bearings, oil supply means for supplying lubricating oil to said bearings, and a speed detection device for detecting the rotational speed of said turbine wheel and said impeller, said speed detection device including a pressure modulation structure provided on said shaft for modulating the pressure of the lubricating oil in said oil supply means in correlation with the rotational speed of said turbine and said impeller, and an oil pressure sensor arranged in said oil supply means for sensing the oil pressure modulation for determining the speed of said turbine and said impeller.

2. The exhaust gas turbocharger according to claim 1, wherein said pressure modulation structure is a means provided on said shaft and interrupting the rotational symmetry of an area of said shaft which is in communication with said oil supply means for modulation of the oil pressure in said oil supply means with the rotational speed of said shaft.

3. The exhaust gas turbocharger according to claim 2, wherein said modulation structure is a recess milled into said shaft.

4. The exhaust gas turbocharger according to claim 2, wherein said oil supply means comprises an oil-pressure modulation duct, via which oil can be fed to the pressure modulation structure.

5. The exhaust gas turbocharger according to claim 4, wherein the oil-pressure modulation duct communicates with an oil supply line in which said oil-pressure sensor is arranged.

6. The exhaust gas turbocharger according to claim 1, wherein the pressure modulation structure is arranged symmetrically in the center of said shaft between said turbine and said compressor.

7. The exhaust gas turbocharger according to claim 1, wherein an oil return line is provided for the return of oil from said friction bearings and from said oil-pressure modulation structure.

* * * * *